(12) United States Patent
Ogino et al.

(10) Patent No.: US 8,263,273 B2
(45) Date of Patent: Sep. 11, 2012

(54) FUEL CELL SYSTEM AND METHOD FOR CONTROLLING THE SAME

(75) Inventors: Shigeru Ogino, Toyota (JP); Satoshi Aoyama, Susono (JP); Satoshi Shiokawa, Susono (JP); Hiroyuki Mitsui, Nagoya (JP); Hiroshi Aoki, Nagoya (JP); Takashi Shimazu, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1548 days.

(21) Appl. No.: 10/585,875

(22) PCT Filed: Feb. 15, 2005

(86) PCT No.: PCT/JP2005/002683
§ 371 (c)(1),
(2), (4) Date: Aug. 11, 2006

(87) PCT Pub. No.: WO2005/081350
PCT Pub. Date: Sep. 1, 2005

(65) Prior Publication Data
US 2009/0035617 A1      Feb. 5, 2009

(30) Foreign Application Priority Data
Feb. 19, 2004    (JP) .................. 2004-043421

(51) Int. Cl.
*H01M 8/06*    (2006.01)
*H01M 8/04*    (2006.01)
*F01N 3/20*    (2006.01)
*G05D 23/00*    (2006.01)

(52) U.S. Cl. ........ 429/425; 429/423; 429/444; 429/443; 422/105; 422/110

(58) Field of Classification Search .................. 429/423, 429/425, 443, 44; 422/105, 110
See application file for complete search history.

(56) References Cited

U.S. PATENT DOCUMENTS
4,128,700 A * 12/1978 Sederquist ............. 429/17
(Continued)

FOREIGN PATENT DOCUMENTS
EP     0 973 220 A2    1/2000
(Continued)

OTHER PUBLICATIONS
"Ammeter." Merriam-Webster Online Dictionary. Accessed on Nov. 23, 2009 from <http://www.merriam-webster.com/dictionary/ammeter>.*
(Continued)

*Primary Examiner* — Barbara Gilliam
*Assistant Examiner* — Edu E Enin-Okut
(74) *Attorney, Agent, or Firm* — Oliff & Berridge, PLC

(57) ABSTRACT

A control device 7 obtains a reformed carbon quantity C supplied to a reform reaction flow channel 21 from a supplied fuel quantity Qf and also obtains a reformed water quantity S supplied to the reform reaction flow channel 21 from a generated power quantity W. Further, it obtains a oxygen consumed quantity consumed through power generation in a fuel cell 3 from the generated power quantity W, a supplied oxygen quantity to be supplied to a cathode flow channel 33 from a supplied cathode gas quantity Qc, and a reformed oxygen quantity O to be supplied to the reform reaction flow channel 21 based on a difference between the supplied oxygen quantity and the consumed oxygen quantity. By correcting a reformed carbon quantity C (delivery of a fuel pump 51) in accordance with the reformed oxygen quantity O, each of O/C and S/C is kept in a target value range.

10 Claims, 7 Drawing Sheets

U.S. PATENT DOCUMENTS

| | | | |
|---|---|---|---|
| 5,441,821 A * | 8/1995 | Merritt et al. | 429/17 |
| 6,033,793 A | 3/2000 | Woods et al. | |
| 6,210,820 B1 | 4/2001 | Knights et al. | |
| 6,673,480 B1 | 1/2004 | Wilkinson et al. | |
| 2001/0028966 A1 | 10/2001 | Knights et al. | |
| 2002/0006535 A1 | 1/2002 | Woods et al. | |
| 2002/0031450 A1* | 3/2002 | Yamashita et al. | 429/17 |
| 2002/0136939 A1 | 9/2002 | Grieve et al. | |

FOREIGN PATENT DOCUMENTS

| | | |
|---|---|---|
| EP | 1 148 024 A1 | 10/2001 |
| EP | 1 233 468 A2 | 8/2002 |
| JP | A 04-133271 | 5/1992 |
| JP | A-09-007618 | 1/1997 |
| JP | 10144335 A * | 5/1998 |
| JP | 2000195534 A * | 7/2000 |
| JP | A 2000-195534 | 7/2000 |
| JP | A-2003-297400 | 10/2003 |
| JP | A-2003-306305 | 10/2003 |
| WO | WO 99/44252 | 9/1999 |

OTHER PUBLICATIONS

Japanese Office Action for corresponding Application No. 2004-043421, dated Feb. 2, 2010.

* cited by examiner

FUEL CELL SYSTEM AND METHOD FOR CONTROLLING THE SAME

TECHNICAL FIELD

The present invention relates to a fuel cell system for generating anode gas containing hydrogen from reform-subject fuel in a reformer and utilizing the hydrogen contained in the anode gas in a fuel cell to generate power and a method for controlling the system.

BACKGROUND ART

A fuel cell system for generating power by utilizing reform-subject fuel such as hydrocarbon or alcohols comprises a reformer for generating anode gas containing hydrogen from the reform-subject fuel, a hydrogen separation membrane device for extracting high-purity hydrogen from the anode gas, and a fuel cell for protonating the hydrogen and causing it to react with oxygen so that power may be generated. This reformer generates the anode gas by conducting, for example, water vapor reformative reaction by use of reform-subject fuel and water, and oxidative reaction by use of reform-subject fuel and oxygen, etc. Further, the hydrogen separation membrane device is provided with hydrogen separation membrane comprised of palladium, etc., which has such properties that only hydrogen may pass through it. Further, the fuel cell has an anode flow channel to which hydrogen is supplied that has passed through the hydrogen separation membrane, a cathode flow channel to which air, etc. is supplied, and a proton conductor (electrolyte) arranged between these flow channels.

In this fuel cell system, hydrogen supplied to the anode flow channel is protonated and permitted to pass through the proton conductor so that this protonated hydrogen (hereinafter referred to as hydrogen proton) may react with oxygen in the air in the cathode flow channel, to generate power while generating water. Such a fuel cell system is exemplified in Patent document 1.

It is to be noted that cathode offgas released from the cathode flow channel contains water generated by the reaction between the hydrogen proton and oxygen, oxygen, etc. left unused in the reaction of the hydrogen proton. Therefore, Patent document 1 utilizes the cathode offgas in water vapor reformative reaction and oxidative reaction in the reformer.

In Patent document 1, a rate of oxidative reaction in the reformer is controlled by adjusting a quantity of oxygen contained in cathode offgas to be sent to the reformer, and also a rate of water vapor reformative reaction in the reformer is controlled by adjusting a quantity of water vapor in cathode offgas to be sent to the reformer. With this, in Patent document 1, mounting a vaporizer conventionally required in the reformer can be eliminated, thereby the system can be downsized.

However, Patent document 1 discloses no specific method for adjusting the quantities of oxygen and water vapor.

Further, to generate power in the fuel cell system, it is necessary to appropriately keep O/C, which is a proportion of a quantity of oxygen O against a quantity of carbon C supplied to the reformer to adjust the quantity of oxidative reaction performed in the reformer. However, Patent document 1 discloses no countermeasures to be taken if a residual oxygen quantity in the reaction between hydrogen proton and oxygen in the cathode flow channel in the fuel cell increases or decreases due to, for example, fluctuations of power generation condition in the fuel cell.

Further, the method disclosed in Patent document 1 adjusts a quantity of oxygen O and a quantity of water S which are supplied to the reformer with reference to a quantity of carbon C which is supplied from a fuel pump to the reformer, to control O/C and S/C. Therefore, to control O/C, an air release valve is required which releases some of cathode offgas or a control valve is required to limit passage of the cathode offgas. Further, to control S/C, a water vapor generation portion, etc. is required which adjusts a quantity of water contained in the cathode offgas. These may complicate the fuel cell system.

Patent document 1: JP 2000-195534 Unexamined Patent Publication (Kokai)

DISCLOSURE OF THE INVENTION

Problems to be Resolved by the Invention

In view of the above conventional problems, the present invention has been developed, and an object of the present invention is to provide a fuel cell system that can use a reformed oxygen quantity O calculated by assuming actual power generation condition in a fuel cell so that O/C in a reform reaction flow channel may be kept to an appropriate value, without complicating the fuel cell system, and a method of controlling the same.

A first aspect of the present invention is a method for controlling a fuel cell system, the system comprising:

a reformer provided with a reform reaction flow channel for generating anode gas containing hydrogen from reform-subject fuel;

a fuel cell provided with an anode flow channel to which the hydrogen contained in the anode gas is supplied by supplying the anode gas from the reform reaction flow channel, a cathode flow channel to which a cathode gas containing oxygen is supplied, and an electrolytic body arranged between the cathode flow channel and the anode flow channel;

a fuel pump for supplying the reform-subject fuel to the reform reaction flow channel;

supplied fuel quantity detecting means for detecting a supplied fuel quantity, which indicates a quantity of the reform-subject fuel supplied by the fuel pump;

a cathode pump for supplying the cathode gas to the cathode flow channel;

supplied cathode gas quantity detecting means for detecting a supplied cathode gas quantity, which indicates a quantity of the cathode gas supplied by the cathode pump;

generated power quantity detecting means for detecting a generated power quantity in the fuel cell; and a control device for controlling a delivery of the reform-subject fuel by the fuel pump and a delivery of the cathode gas by the cathode pump so that the generated power quantity may be equal to a requested generation power quantity which is necessary to operate a load utilizing power generated by the fuel cell, wherein:

a cathode offgas line for sending the cathode offgas released from the cathode flow channel to the reform reaction flow channel is connected to the cathode flow channel; and the method comprising:

a reformed carbon quantity calculation step for obtaining a reformed carbon quantity C, which indicates a quantity of carbon supplied to the reform reaction flow channel, based on the supplied fuel quantity;

a reformed oxygen quantity calculation step for obtaining a consumed oxygen quantity, which indicates a quantity of oxygen contained in the cathode gas consumed to generate power in the fuel cell, from the generated power quantity and also obtaining a supplied oxygen quantity, which indicates a quantity of oxygen supplied to the cathode flow channel, from the supplied cathode gas quantity and then obtaining the residual oxygen quantity in the cathode offgas by subtracting the consumed oxygen quantity from the supplied oxygen quantity and obtaining a reformed oxygen quantity O, which indicates a quantity of oxygen supplied to the reform reaction flow channel, based on the residual oxygen quantity; and a reformed carbon quantity correction step for correcting the reformed carbon quantity C by changing the delivery of the fuel pump so that O/C, which is a proportion of the reformed oxygen quantity O against the reformed carbon quantity C, may be kept in a target range.

The fuel cell system of the present invention has the reformer, the fuel cell, the fuel pump, the supplied fuel quantity detecting means, the cathode pump, the supplied cathode gas quantity detection means, the generated power quantity detecting means, the control device, etc. in such a configuration that residual oxygen in the cathode offgas released from the cathode flow channel in the fuel cell may be utilized in the reformer.

According to the fuel cell system control method of the present invention, it is possible to change a delivery of the fuel pump based on a change in the residual oxygen quantity, thereby performing correction so that O/C in the reformer may be an appropriate value.

To set the fuel cell system in motion, the control device takes in a requested generation power quantity which the fuel cell is required to generate in order to operate the load, to determine a delivery of the fuel pump and a delivery of the cathode pump so that the requested generation power quantity may be satisfied by the power generated by the fuel cell. In this case, the control device can determine the delivery of each pump by using a relational map in which a relationship between the delivery of each pump and power generated by the fuel cell is obtained beforehand.

Then, reform-subject fuel is supplied from the fuel pump to the reform reaction flow channel of the reformer and cathode gas is supplied from the cathode pump to the cathode flow channel in the fuel cell. In this reformer, the reform-subject fuel, water, oxygen, etc. are used to generate anode gas containing hydrogen, which the hydrogen contained in the anode gas is supplied to the anode flow channel in the fuel cell.

Subsequently, in the fuel cell, the hydrogen supplied to the anode flow channel is protonated and passes through the electrolytic body to reach the cathode flow channel, where the protonated hydrogen and the oxygen in the cathode gas react with each other to generate power.

Cathode offgas released from the cathode flow channel is sent via the cathode offgas line to the reform reaction flow channel. In this case, the cathode offgas contains residual oxygen left unused in power generation in the fuel cell, water generated through power generation in the fuel cell, etc., so that these residual oxygen, generated water, etc. can react with the reform-subject fuel to generate anode gas.

It is to be noted that to generate power stably and efficiently in the fuel cell system, it is important to appropriately keep O/C, which is a proportion of a reformed oxygen quantity O against that of a reformed carbon quantity C which are supplied to the reform reaction flow channel. On the other hand, the reformed oxygen quantity O supplied to the reform reaction flow channel is greatly influenced by power generation condition in the fuel cell and so may fluctuate with the power generation condition in the fuel cell.

To solve this problem, the present invention performs the steps to calculate a reformed carbon quantity and a reformed oxygen quantity, thereby calculating the O/C.

Especially in the reformed carbon quantity calculation step, a consumed oxygen quantity during a process where power is actually generated in the fuel cell is calculated and subtracted from a supplied oxygen quantity in the cathode gas supplied to the cathode gas flow channel, to calculate a residual oxygen quantity actually left unused in the cathode gas. Based on this residual oxygen quantity, a reformed oxygen quantity O supplied to the reform reaction flow channel is calculated. Therefore, a value of this reformed oxygen quantity O is given taking into account power generation condition in the fuel cell, thus providing a reference for correcting O/C into a target range.

In the reformed carbon quantity correction step, on the other hand, the control device changes a delivery of the fuel pump so that this calculated O/C may fall in the target range. It is thus possible to appropriately correct a proportion of the reformed carbon quantity C against the reformed oxygen quantity O, which serves as the reference.

Further, according to the present invention, a reformed carbon quantity C is corrected corresponding to are formed oxygen quantity O calculated on the basis of the residual oxygen quantity, so that O/C can be kept to an appropriate value without mounting a control valve, etc. for controlling the reformed oxygen quantity O supplied to the reform reaction flow channel.

For this reason, according to the fuel cell system control method of the present invention, O/C in the reform reaction flow channel can be kept to an appropriate value by using a reformed oxygen quantity O which is calculated by assuming actual power generation condition in the fuel cell without complicating the fuel cell system.

A second aspect of the present invention is a fuel cell system comprising:

a reformer provided with a reform reaction flow channel for generating anode gas containing hydrogen from reform-subject fuel;

a fuel cell provided with an anode flow channel to which the hydrogen contained in the anode gas is supplied by supplying the anode gas from the reform reaction flow channel, a cathode flow channel to which a cathode gas containing oxygen is supplied, and an electrolytic body arranged between the cathode flow channel and the anode flow channel;

a fuel pump for supplying the reform-subject fuel to the reform reaction flow channel;

supplied fuel quantity detecting means for detecting a supplied fuel quantity, which indicates a quantity of the reform-subject fuel supplied by the fuel pump;

a cathode pump for supplying the cathode gas to the cathode flow channel;

supplied cathode gas quantity detecting means for detecting a supplied cathode gas quantity, which indicates a quantity of the cathode gas supplied by the cathode pump;

generated power quantity detecting means for detecting a generated power quantity in the fuel cell; and a control device for controlling a delivery of the reform-subject fuel by the fuel pump and a delivery of the cathode gas by the cathode pump so that the generated power quantity may be equal to a requested generation power quantity which is necessary to operate a load utilizing power generated by the fuel cell, wherein:

a cathode offgas line for sending the cathode offgas released from the cathode flow channel to the reform reaction flow channel is connected to the cathode flow channel; and the control device is configured to perform:

a reformed carbon quantity calculation step for obtaining a reformed carbon quantity C, which indicates a quantity of carbon supplied to the reform reaction flow channel, based on the supplied fuel quantity;

a reformed oxygen quantity calculation step for obtaining a consumed oxygen quantity, which indicates a quantity of oxygen contained in the cathode gas consumed to generate power in the fuel cell, from the generated power quantity and also obtaining a supplied oxygen quantity, which indicates a quantity of oxygen supplied to the cathode flow channel, from the supplied cathode gas quantity and then obtaining the residual oxygen quantity in the cathode offgas by subtracting the consumed oxygen quantity from the supplied oxygen quantity and obtaining a reformed oxygen quantity O, which indicates a quantity of oxygen supplied to the reform reaction flow channel, based on the residual oxygen quantity; and a reformed carbon quantity correction step for correcting the reformed carbon quantity C by changing the delivery of the fuel pump so that O/C, which is a proportion of the reformed oxygen quantity O against the reformed carbon quantity C, may be kept in a target range.

Also by the fuel cell system of the present invention, similar to the above-described aspect of the present invention, without complicating the fuel cell system, it is possible to use a reformed oxygen quantity O which is calculated by assuming actual power generation condition in the fuel cell, thereby keeping O/C in the reform reaction flow channel to an appropriate value.

BEST MODE FOR CARRYING OUT THE INVENTION

Figure 1:
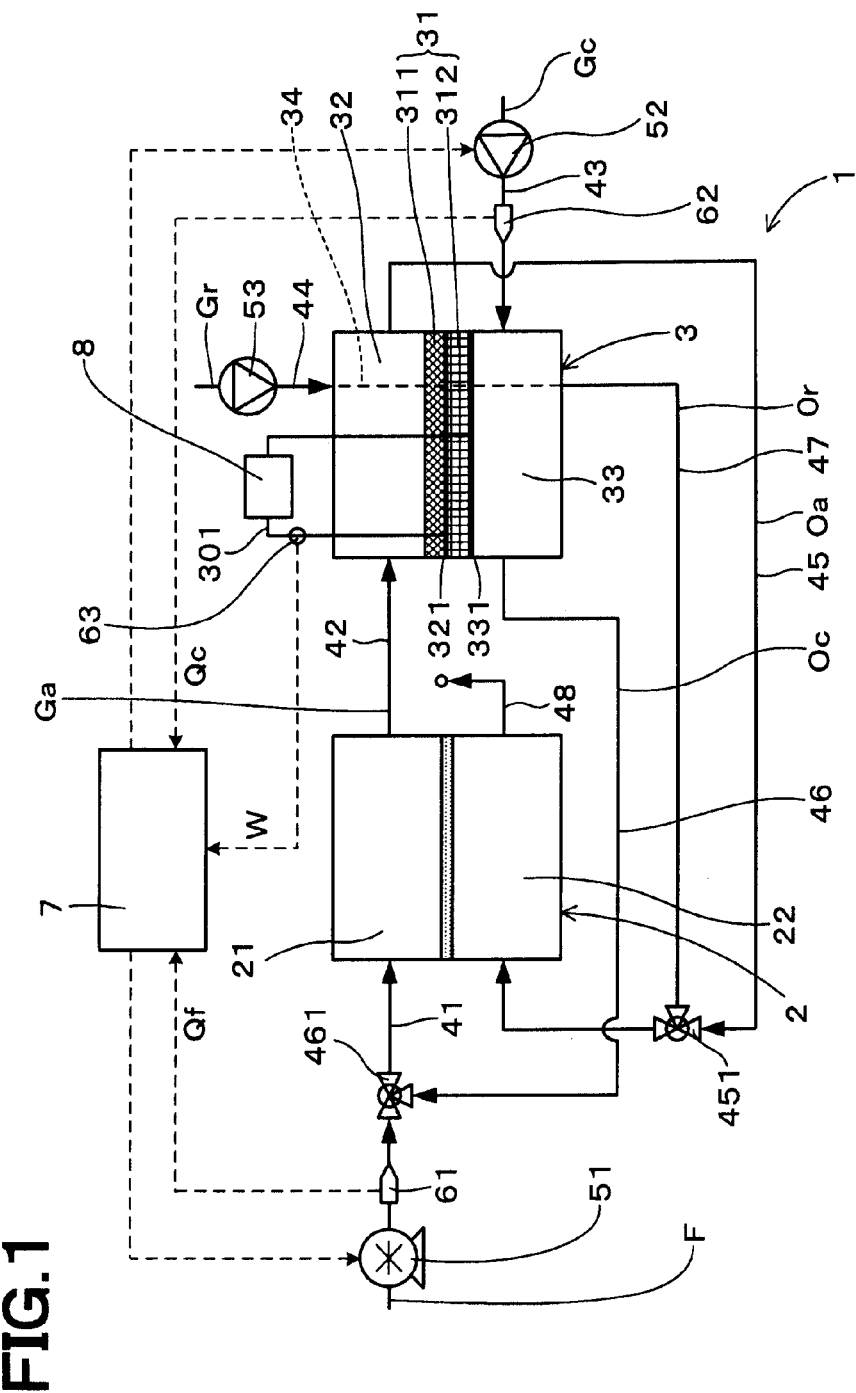
FIG. 1 is an explanatory diagram of a configuration of a fuel cell system according to an embodiment.

The following describes preferred embodiments of the above-described first and second aspects of the present invention.

In the first aspect of the present invention, it is preferable that the method for controlling a fuel cell system further comprise:

a reformed water quantity calculation step for obtaining a quantity of generated water, which is a quantity of water generated in the cathode flow channel obtained by generation in the fuel cell, based on the generated power quantity, and obtaining a reformed water quantity S, which is a quantity of water supplied to the reform reaction flow channel, based on the quantity of generated water; and when correcting the reformed carbon quantity C with changing a delivery of the fuel pump in the reformed carbon quantity correction step, keeping also S/C, which is a proportion of the reformed water quantity S against the reformed carbon quantity C, in a target range.

In this case, the control device performs, besides the reformed carbon quantity calculation step and the reformed oxygen quantity calculation step, the reformed water quantity calculation step also to calculate the reformed water quantity S, thereby calculating the S/C. When changing a delivery of the fuel pump to correct the reformed carbon quantity C in the reformed carbon quantity correction step, the correction can be performed so that S/C may also fall in a target range, thereby keeping S/C in the reform reaction flow channel also to an appropriate value.

It is thus possible to use a reformed oxygen quantity O calculated by assuming actual power generation condition in the fuel cell so that S/C in the reform reaction flow channel also may be kept to an appropriate value, thereby permitting the fuel cell system to generate power stably and efficiently.

Further, it is preferable that the method for controlling a fuel cell system further comprise:

a generated power quantity recovery step for: performing the reformed carbon quantity calculation step, the reformed oxygen quantity calculation step, the reformed water quantity calculation step and the reformed carbon quantity correction step, if the fuel cell system encounters an abnormality to lower the generated power quantity below the requested generation quantity, and increasing a delivery of the fuel pump and increasing the reformed carbon quantity C depends on an increase of the reformed oxygen quantity O due to a decrease in the generated power quantity, so that the above-described O/C may fall in the target range and the generated power quantity is recovered to meet the requested generation quantity.

This is how to accommodate a case where some abnormality has occurred on the fuel cell system to lower a generated power quantity in the fuel cell below the requested generation power quantity. That is, in this case, a decrease in the generated power quantity causes a decrease in consumed oxygen quantity in a cathode gas consumed in power generation in the fuel cell, so that by that much the residual oxygen quantity left unused in cathode offgas increases, to increase the reformed oxygen quantity O supplied to the reform reaction flow channel.

Therefore, as the generated power quantity recovery step, the control device can increase a delivery of the fuel pump in accordance with an increase in the reformed oxygen quantity O, to increase the reformed carbon quantity C, thereby keeping the above-described O/C in the target range. Further, by increasing the reformed carbon quantity C, a generated power quantity in the fuel cell can be recovered so that the requested generation power quantity may be met.

It is thus possible to keep O/C in the reform reaction flow channel to an appropriate value and keep up a generated power quantity in the fuel cell to meet a requested generation power quantity even in the case of an abnormal situation in the fuel cell system.

It is to be noted that the abnormal situations in the fuel cell system may include, for example, a case where a quantity of hydrogen in anode gas generated in the reform reaction flow channel has decreased for some reason, a case where a temperature at the reform reaction flow channel or at the fuel cell has dropped for some reason, etc. Further, they may also include a case where an electrolytic body has been dried if the fuel cell were, for example, a proton-exchange membrane fuel cell or a phosphoric-acid fuel cell.

Further, it is preferable that the method for controlling a fuel cell system further comprise a step in the generated power quantity recovery step for limiting an increase of a delivery in the fuel pump so that the above-described S/C may not be 1 or less, when increasing the delivery of the fuel pump.

It is to be noted that in the fuel cell system control method, as described above, the reformed carbon quantity C is adjusted by using the reformed oxygen quantity O as a reference, to keep O/C to an appropriate value, thus adjusting O/C in preference to S/C.

Therefore, in the generated power quantity recovery step, when correcting the reformed carbon quantity C by increasing a delivery of the fuel pump, the above-described S/C is checked so that it may not be 1 or less. It is thus possible to prevent a case from occurring where S/C becomes 1 or less to leave carbon contained in a reform-subject fuel as unreacted in the reform reaction flow channel, thus deteriorating a reform catalyst etc. arranged in the reform reaction flow channel.

It is preferable that the reformer be provided with a heating flow channel which is formed adjacent to the reform reaction flow channel, to perform burning reaction so that this reform reaction flow channel may be heated; and the method further comprise a step in the generated power quantity recovery step for suppressing burning reaction in the heating flow channel if a delivery of the fuel pump cannot be increased because the above-described S/C may be 1 or less.

Since the heating flow channel is provided adjacent to the reform reaction flow channel, it is easy for the reformer to combine oxidative reaction in the reform reaction flow channel and burning reaction in the heating flow channel so that a temperature in the reform reaction flow channel may be kept in an appropriate temperature range. Further, by performing burning reaction in the heating flow channel, it is possible to reduce a quantity of reform-subject fuel consumed in oxidative reaction in the reform reaction flow channel.

Further, if a delivery of the fuel pump cannot be increased because S/C becomes 1 or less in the generated power quantity recovery step, it means that the reformed oxygen quantity O supplied to the reform reaction flow channel is in excess, so that the above-described O/C is considered to be above a target range. In such a case, the reform reaction flow channel may be heated more than necessary owing to excess in the reformed oxygen quantity O. In this case, by suppressing the burning reaction in the heating flow channel provided to heat the reform reaction flow channel, the temperature in the reform reaction flow channel can be kept to an appropriate level.

Further, it is preferable that the method for controlling a fuel cell system further comprise:

a generated power quantity following step for, if the requested generation power quantity is changed to increase, re-determining to increase a delivery of the fuel pump and that of the cathode pump, on the other hand, if the requested generation power quantity is changed to decrease, re-determining to decrease a delivery of the fuel pump and that of the cathode pump, thereby causing the generated power quantity to follow the requested generation quantity; and an O/C correction step for, after performing the reformed carbon quantity calculation step, the reformed oxygen quantity calculation step, and the reformed water quantity calculation step again after this generated power quantity following step is performed, if the above-described O/C is above the target range, increasing the delivery of the fuel pump and correcting the reformed carbon quantity C to increase so that this O/C may be returned into the target range, on the other hand, if the above-described O/C is below the target range, decreasing the delivery of the fuel pump and correcting the reformed oxygen quantity C to decrease so that this O/C may be returned into the target range.

In this case, the control method is given for causing the generated power quantity to follow a requested generation power quantity generated in the fuel cell if this requested quantity is changed.

That is, in the generated power quantity following step, if the requested generation power quantity is changed to increase, the generated power quantity in the fuel cell needs to be increased correspondingly, so that the control device increases the delivery of the fuel pump and that of the cathode pump according to an increase in generated power quantity. The delivery of each of the pumps is thus re-determined appropriately.

If the requested generation power quantity is changed to decrease, on the other hand, the generated power quantity in the fuel cell needs also to be decreased correspondingly, so that the control device decreases the delivery of the fuel pump and that of the cathode pump according to a decrease in generated power quantity. In such a manner also, the delivery of each of the pumps is re-determined appropriately. It is thus possible to change the generated power quantity of the fuel cell correspondingly in accordance with a magnitude of a change in requested generation power quantity.

After the generated power quantity of the fuel cell is changed (after the generated power quantity following step), O/C in the reform reaction flow channel may be out of the target range. Therefore, in such a case, as the O/C correction step, first the reformed carbon quantity calculation step, reformed oxygen quantity calculation step, and reformed water quantity calculation step are performed to calculate the reformed carbon quantity C, the reformed oxygen quantity O, and reformed water quantity S respectively, thereby calculating the O/C and S/C.

If O/C is above the target range, the reformed oxygen quantity O is considered to be in excess, so that the delivery of the fuel pump is increased to correct the reformed carbon quantity C so that it may increase. It is thus possible to return O/C into the target range, thereby keeping it to an appropriate value. If O/C is below the target range, on the other hand, the reformed oxygen quantity O is considered to be insufficient, so that the delivery of the fuel pump is decreased to correct the reformed carbon quantity C so that it may decrease. It is thus possible to return O/C into the target range, thereby keeping it to an appropriate value.

Further, it is preferable that the method for controlling a fuel cell system further comprise a step in the O/C correction step for limiting an increase of a delivery of the fuel pump so that the above-described S/C may not be 1 or less, when increasing the delivery of the fuel pump.

In this case, by seeing to it that S/C may not be 1 or less in the O/C correction step, it is possible, as described above, to prevent a case from occurring where S/C becomes 1 or less to leave carbon contained in a reform-subject fuel as unreacted in the reform reaction flow channel, thus deteriorating a reform catalyst etc. arranged in the reform reaction flow channel.

Further, it is preferable that the reformer be provided with the heating flow channel which is formed adjacent to the reform reaction flow channel, to perform burning reaction so that this reform reaction flow channel may be heated; and the method further comprise a step in the O/C correction step for suppressing burning reaction in the heating flow channel if a delivery of the fuel pump cannot be increased because the above-described S/C may be 1 or less.

In this case, by performing burning reaction in the heating flow channel in the O/C correction step, it is possible to, as described above, easily keep the temperature in the reform reaction flow channel in an appropriate temperature range and decrease the consumption quantity of the reform-subject fuel used in the oxidative reaction in the reform reaction flow channel. In this case also, as in the case described above, by suppressing the burning reaction in the heating flow channel provided to heat the reform reaction flow channel, the temperature in the reform reaction flow channel can be kept to an appropriate level.

In the second aspect of the present invention, it is preferable that the control device be configured to:

perform also a reformed water quantity calculation step for obtaining a quantity of generated water, which is a quantity of water generated in the cathode flow channel obtained by generation in the fuel cell, based on the generated power quantity, and obtaining a reformed water quantity S, which is a quantity of water supplied to the reform reaction flow channel, based on the quantity of generated water; and when correcting the reformed carbon quantity C with changing a delivery of the fuel pump in the reformed carbon quantity correction step, keep also S/C, which is a proportion of the reformed water quantity S against the reformed carbon quantity C, in a target range.

In this case, the control device performs, besides the reformed carbon quantity calculation step and the reformed oxygen quantity calculation step, the reformed water quantity calculation step also to calculate the reformed water quantity S, thereby calculating the S/C. When changing a delivery of the fuel pump to correct the reformed carbon quantity C in the reformed carbon quantity correction step, the correction can be performed so that S/C may also fall in a target range, thereby keeping S/C in the reform reaction flow channel also to an appropriate value.

It is thus possible to use a reformed oxygen quantity O calculated by assuming actual power generation condition in the fuel cell so that S/C in the reform reaction flow channel also may be kept to an appropriate value, thereby permitting the fuel cell system to generate power stably and efficiently.

Further, in the first and second aspects of the present invention, the reformed carbon quantity C can be obtained as a molar quantity of carbon atoms (C) contained in a reform-subject fuel supplied to the reform reaction flow channel and the reformed oxygen quantity O can be obtained as a molar quantity of oxygen atoms (O) contained in cathode gas supplied to the reform reaction flow channel. Also, the reformed water quantity S can be obtained as a molar quantity of generated water ($H_2O$) generated by reaction in the fuel cell.

Further, a generated power quantity in the fuel cell is closely related to a consumed hydrogen of quantity (consumed hydrogen quantity in power generation reaction) in anode gas supplied to the anode flow channel and a consumed oxygen quantity (consumed oxygen quantity in power generation reaction) in cathode gas supplied to the cathode flow channel as well as to a quantity of water (quantity of generated water) generated by these consumptions. Therefore, in the present invention, a generated power quantity in the fuel cell detected by the generated power quantity detecting means is used to obtain the consumed oxygen quantity and reformed water quantity, which are utilized in the fuel cell system control method.

Further, the target range of the above-described O/C can be set to, for example, 0 through 1.2 in molar ratio and that of the above-described S/C can be set to, for example, 1 through 3 in molar ratio.

If the O/C is above the target range, oxidative reaction in the reform reaction flow channel by use of reform-subject fuel and oxygen goes excess, not only to overheat the reform reaction flow channel but also to consume the reform-subject fuel excessively for use other than generation of hydrogen, thereby deteriorating an energy efficiency.

If the O/C is below the target range, on the other hand, the oxidative reaction goes insufficient in the reform reaction flow channel to decrease a temperature of the reform reaction flow channel, so that the efficiency of conversion from the reform-subject fuel to hydrogen may be deteriorated.

Further, it is not always necessary to perform the reformed carbon quantity calculation step, the reformed oxygen quantity calculation step, and the reformed water quantity calculation step in this order, but they may be performed in random order. Further, these steps can be performed concurrently.

Further, the reformed carbon quantity calculation step, the reformed oxygen quantity calculation step, the reformed water quantity calculation step, and the reformed carbon quantity correction step can be performed when power generation in the fuel cell has stabilized. Further, the reformed carbon quantity calculation step, the reformed oxygen quantity calculation step, the reformed water quantity calculation step, and the reformed carbon quantity correction step can be performed only if some abnormality has occurred in the fuel cell system to drop the above-described generated power quantity or the above-described requested generation power quantity has been changed to increase.

Further, it is possible in the reform reaction flow channel in the reformer to, for example, perform water vapor reform reaction for generating hydrogen, carbon monoxide, etc. from the reform-subject fuel and water through a reform catalyst and oxidative reaction for generating water, carbon dioxide, etc. by burning part of the reform-subject fuel and oxygen. It is then possible to, while generating hydrogen through the water vapor reform reaction, perform the exothermic reaction as oxidative reaction against this water vapor reform reaction as endothermic reaction, thereby keeping reaction temperature high in the reformer.

Further, it is possible to supply the anode flow channel in the fuel cell directly with anode gas generated in the reform reaction flow channel in the reformer. In this case, for example, the electrolytic body in the fuel cell can be formed by laminating one on the other a hydrogen separation metal layer for causing hydrogen in the anode gas supplied to the anode flow channel to pass through and a proton conductor layer made of ceramic for causing hydrogen which has passed through this hydrogen separation metal layer to pass through in protonated condition so that it may reach the cathode flow channel.

Besides, it is also possible to provide hydrogen separation metal for separating hydrogen from the anode gas between the reformer and the fuel cell so that hydrogen that has passed through this hydrogen separation metal may be supplied to the anode flow channel in the fuel cell.

Further, the above-described reform-subject fuel may be, for example, hydrocarbon fuel, alcohol fuel, etc. This hydrocarbon fuel may be, for example, fuel gas such as methane or ethane, liquefied petroleum gas such as propane or butane, or gasoline such as octane. Further, this alcohol fuel may be, for example, methanol, ethanol, etc.

EMBODIMENTS

The following describes embodiments of a fuel cell system and a method for controlling the same according to the present invention, with reference to FIGS. 1-7.

First Embodiment

As shown in FIG. 1, when controlling a fuel cell system 1 of the present embodiment having a reformer 2 provided with a reform reaction flow channel 21 for generating hydrogen and a fuel cell 3 for generating power by utilizing this hydrogen, a reformed oxygen quantity O calculated by assuming actual power generation condition in the fuel cell 3 can be used to keep to an appropriate value each of O/C, which is a proportion of the reformed oxygen quantity O against a reformed carbon quantity C in the reform reaction flow channel 21, and S/C, which is a proportion of a reformed water quantity S against the reformed carbon quantity C.

That is, as shown in FIG. 1, the reformer 2 comprises the reform reaction flow channel 21 for generating anode gas Ga containing hydrogen from reform-subject fuel F and a heating flow channel 22 formed adjacent to this flow channel 21 for heating it by burning reaction. The fuel cell 3 further comprises an anode flow channel 32 supplied with anode gas Ga from the reform reaction flow channel 21, a cathode flow channel 33 supplied with cathode gas Gc containing oxygen, an electrolytic body 31 provided between these cathode flow channel 33 and anode flow channel 32, and a cooling medium flow channel 34 supplied with cooling medium gas Gr for cooling this fuel cell 3.

As shown in FIG. 1, the fuel cell system 1 further comprises a fuel pump 51, a supplied fuel quantity detecting means 61, a cathode pump 52, a supplied cathode gas detection means 62, a generated power quantity detecting means 63, and a control device 7.

The fuel pump 51 is arranged to supply reform-subject fuel F to the reform reaction flow channel 21 and the cathode pump 52 is arranged to supply cathode gas Gc to the cathode flow channel 33.

The supplied fuel quantity detecting means 61 is arranged to detect a supplied fuel quantity Qf, which indicates a quantity of the reform-subject fuel F supplied by the fuel pump 51, the supplied cathode gas quantity detection means 62 is arranged to detect a supplied cathode gas quantity Qc, which indicates a quantity of the cathode gas Gc supplied by the cathode pump 52, and the generated power quantity detecting means 63 is arranged to detect a generated power quantity W given by the fuel cell 3.

Further, as shown in FIG. 1, to an exit of the cathode flow channel 33, a cathode offgas line 46 is connected for sending cathode offgas Oc released from this channel to an entrance of the reform reaction flow channel 21 so that the reform reaction flow channel 21 may utilize the cathode offgas Oc to perform water vapor reform reaction and oxidative reaction. Further, the cathode offgas Oc contains residual oxygen left unused in power generation in the fuel cell 3, generated water, which is water generated through power generation in the fuel cell 3, and has high temperature heat energy generated through power generation in the fuel cell 3, so that it is possible in the reform reaction flow channel 21 to generate anode gas Ga by utilizing these residual oxygen, generated water, and high temperature heat energy.

Further, the control device 7 is arranged to determine a delivery of the fuel pump 51 and that of the cathode pump 52 so that a generated power quantity W detected by the generated power quantity detecting means 63 may be equal to a requested generation power quantity Wr which the fuel cell is required to generate in order to operate a load 8.

It is to be noted that a requested generation power quantity Wr refers to a generated power quantity W which the fuel cell 3 is requested to generate in order to operate the load 8, so that the control device 7 controls power generation in the fuel cell 3 by using the requested generation power quantity Wr as a target generated power quantity.

Figure 2:
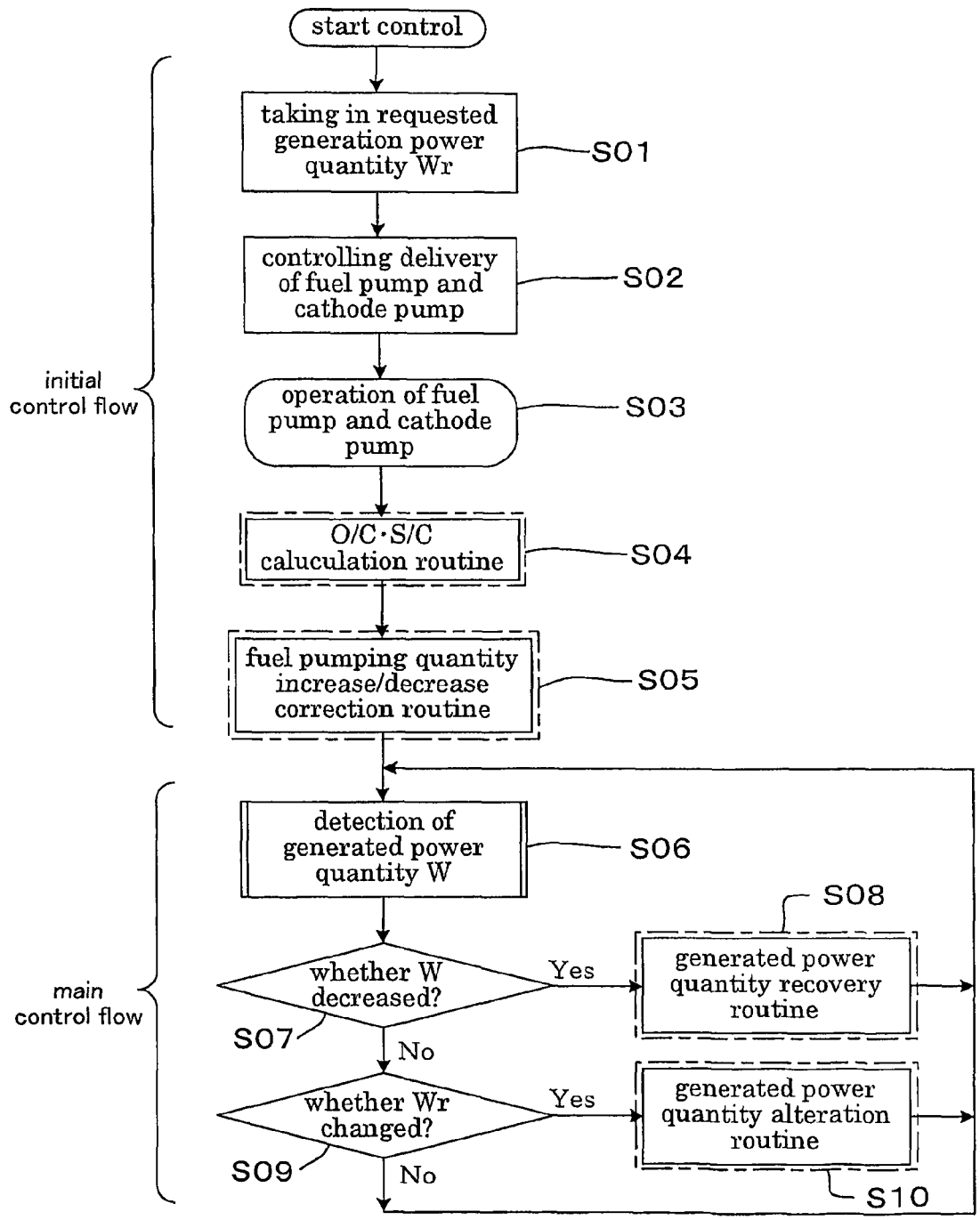
FIG. 2 is a flowchart for showing an initial control flow and a main control flow related to a method for controlling the fuel cell system according to the embodiment.
Figure 3:
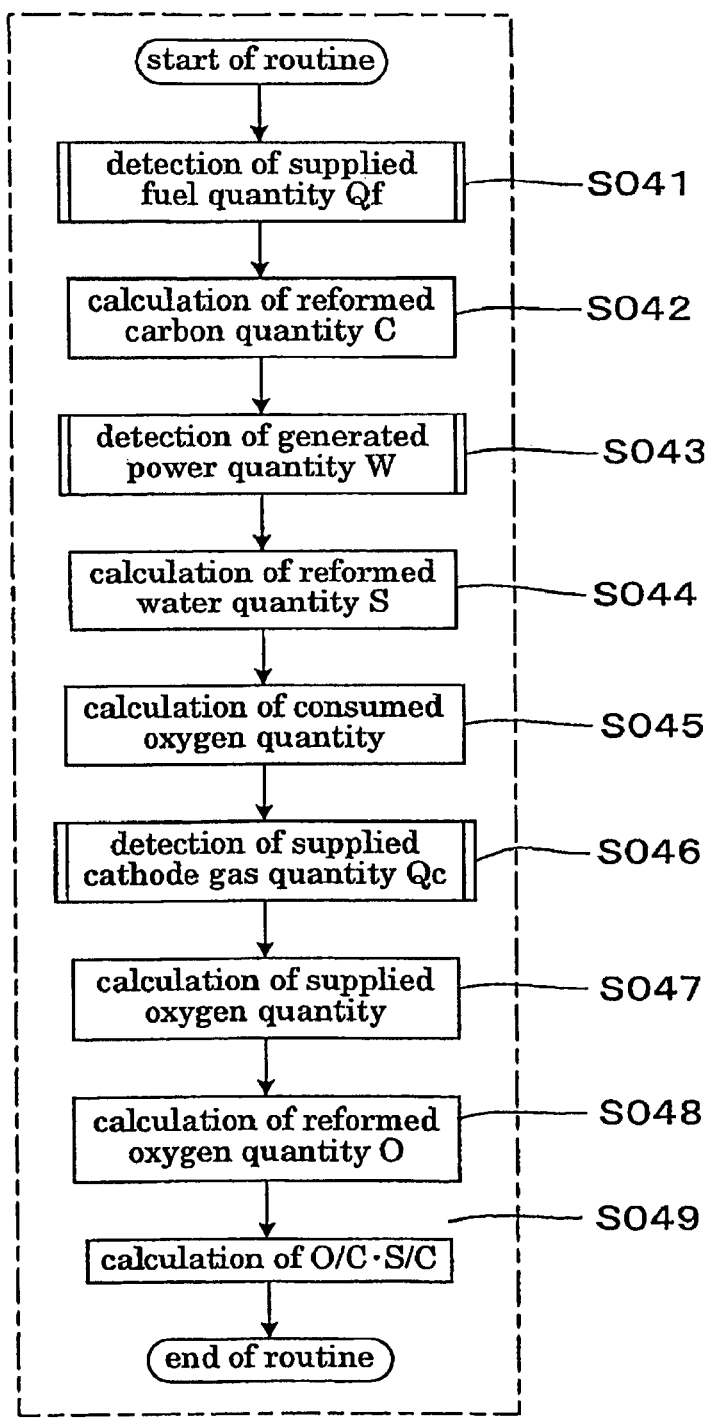
FIG. 3 is a flowchart for showing an O/C·S/C calculation routine related to the fuel cell system control method according to the embodiment.
Figure 4:
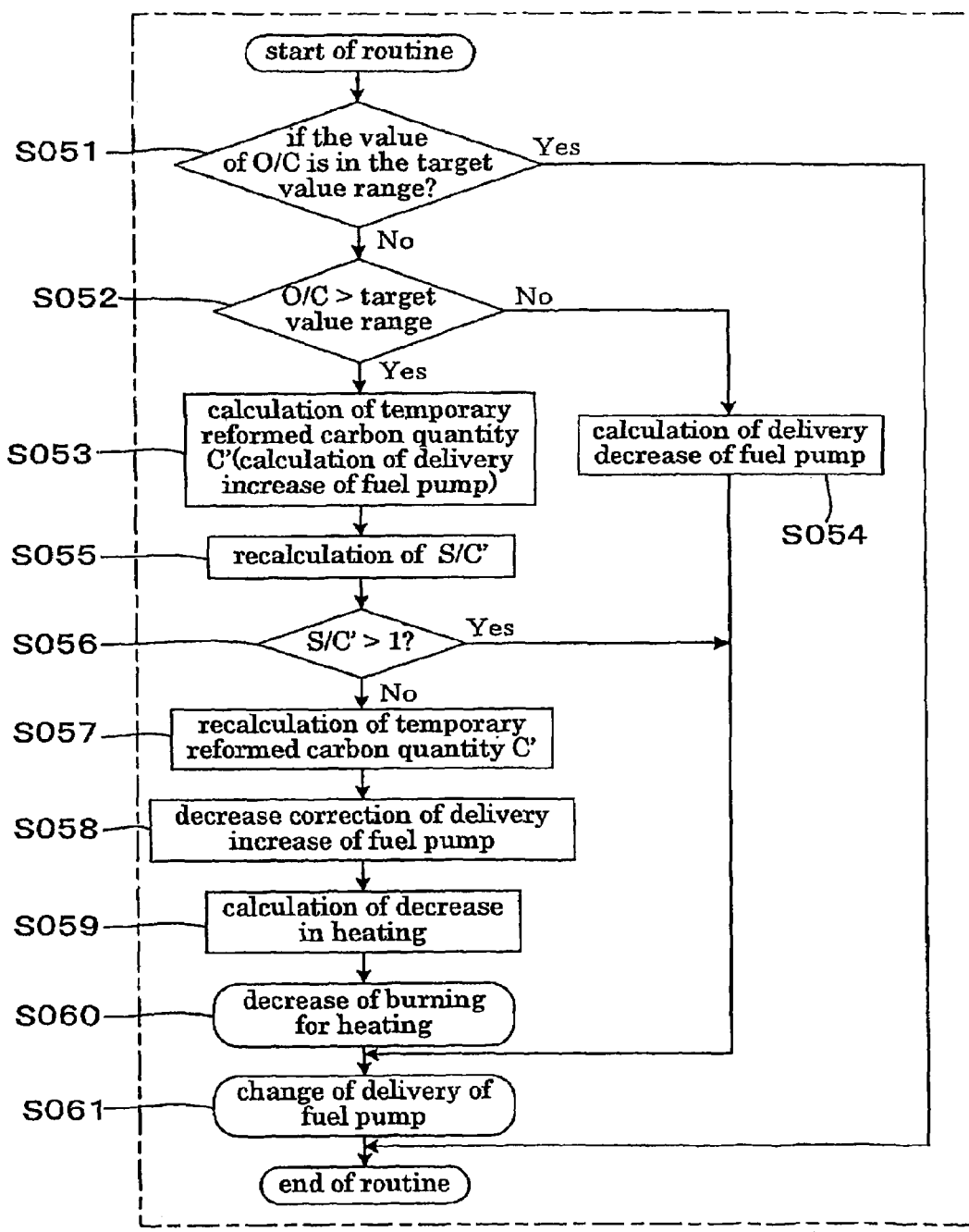
FIG. 4 is a flowchart for showing a fuel increase/decrease correction routine related to the fuel cell system control method according to the embodiment.

As shown in FIGS. 2-4, the control device 7 performs a reformed carbon quantity calculation step, a reformed oxygen quantity calculation step, a reformed water quantity calculation step, and a reformed carbon quantity correction step, to correct the reformed carbon quantity C to be supplied to the reform reaction flow channel 21 according to the reformed oxygen quantity O to be supplied to the reform reaction flow channel 21.

That is, as shown in FIG. 3, in the reformed carbon quantity calculation step, the control device 7 obtains the reformed carbon quantity C, which is a quantity of carbon to be supplied to the reform reaction flow channel 21, based on the supplied fuel quantity Qf detected by the supplied fuel quantity detecting means 61.

Further, as shown in FIG. 3, at the reformed oxygen quantity calculation step, the control device 7 first obtains a consumed oxygen quantity, which is a quantity of oxygen in the cathode gas Gc consumed to generate power in the fuel cell 3, from the generated power quantity W detected by the generated power quantity detecting means 63. Further, the control device 7 obtains a supplied oxygen quantity, which is a quantity of oxygen supplied to the cathode flow channel 33, from the supplied cathode gas quantity Qc detected by the supplied cathode gas quantity detection means 62.

Subsequently, the control device 7 subtracts the consumed oxygen quantity from the supplied oxygen quantity to obtain a residual oxygen quantity in the cathode offgas Oc. In such a manner, the reformed oxygen quantity O, which is the quantity of oxygen supplied to the reform reaction flow channel 21, is obtained on the basis of the residual oxygen quantity.

As shown in FIG. 3 again, in the reformed water quantity calculation step, the control device 7 obtains a generated water quantity, which is a quantity of water generated in the cathode flow channel 33 through power generation in the fuel cell 3, from the generated power quantity W detected by the generated power quantity detecting means 63. It then obtains the reformed water quantity S, which is a quantity of water supplied to the reform reaction flow channel 21, based on the generated water quantity.

In such a manner, the reformed carbon quantity C, the reformed oxygen quantity O, and the reformed water quantity S in the reform reaction flow channel 21 can be obtained respectively.

Subsequently, as shown in FIG. 4, in the reformed carbon quantity correction step, the control device 7 changes the delivery of the fuel pump 51 so that the above-described O/C and S/C may fall in their respective target value ranges.

That is, in the reformed carbon quantity correction step, the reformed carbon quantity C is corrected according to this reformed oxygen quantity O with reference to a reformed oxygen quantity O obtained at the reformed oxygen quantity calculation step so that O/C may fall in a target value range. Further, in this correction of O/C, it corrects (changes) the reformed carbon quantity C so that S/C may not go out of a target value range. It is supposed in the present embodiment that a target value of O/C is selected between 0 and 1.2 and that of S/C, between 1 and 3. Further, the target value range refers to a range somewhat expanded in both plus and minus directions with respect to a target value.

This is detailed below.

As shown in FIG. 1, electrolytic body 31 in the fuel cell 3 of the present embodiment is obtained by laminating one on the other a hydrogen separation metal layer 311 for causing hydrogen in anode gas Ga supplied to the anode flow channel 32 to pass through and a ceramic-made proton conductor layer 312 for causing hydrogen which has passed through this hydrogen separation metal layer 311 to pass through in protonated condition so that it may reach the cathode flow channel 33. The hydrogen separation metal layer 311 is made of metal containing palladium (Pd) and the proton conductor layer 312 is made of $BaCeO_3$-based or $SrCeO3$-based perovskite-type oxide. With this, the fuel cell 3 can generate power without impregnating the proton conductor layer 312 with water, thus being able to operate at a high temperature of, for example, 300-600° C.

Further, a temperature of anode gas Ga generated in the reform reaction flow channel 21 in the reformer 2 can be set to 300-600° C. Therefore, in the present embodiment, the temperature in the reform reaction flow channel 21 and the operating temperature of the fuel cell 3 can be set to approximately the same, thus directly supplying the anode gas Ga from the reform reaction flow channel 21 to the anode flow channel 32 in the fuel cell 3.

Further, cathode offgas Oc released to the cathode flow channel 33 can be sent directly to the reform reaction flow channel 21 at a high temperature close to the operating temperature of the fuel cell 3.

Further, as shown in FIG. 1, the electrolytic body 31 has an anode electrode 321 formed on a surface of the proton conductor layer 312 on the side of the anode flow channel 32 and a cathode electrode 331 formed on a surface of the proton conductor layer 312 on the side of the cathode flow channel 33. Further, between the anode electrode and the cathode electrode, a cell output wiring line 301 is connected for taking out power from the fuel cell 3, to which cell output wiring line 301 is connected the load 8 that operates on power generated by the fuel cell 3.

Further, the generated power quantity detecting means 63 can measure a value of power or current at the cell output wiring line 301 to detect a generated power quantity W by the fuel cell 3.

Further, the generated power quantity detecting means 63 can serve as a power meter for detecting a power quantity at the fuel cell 3. Further, since a voltage of power generation of the fuel cell 3 is roughly constant often, the generated power quantity detecting means 63 can serve also as an ammeter for detecting a quantity of a current at the fuel cell 3, for example.

Further, the supplied fuel quantity detecting means 61 and the supplied cathode gas quantity detection means 62 can serve as a flow meter.

Further, as shown in FIG. 1, an entrance of the reform reaction flow channel 21 and the fuel pump 51 are connected to each other via a fuel supply line 41 for supplying reform-subject fuel F from the fuel pump 51 to the reform reaction flow channel 21. The supplied fuel quantity detecting means 61 is arranged along a fuel supply line 41.

Further, the cathode flow channel 33 and the cathode pump 52 are connected to each other via a cathode gas supply line 43 for supplying the cathode gas Gc from the cathode pump 52 to the cathode flow channel 33. The supplied cathode gas quantity detection means 62 is arranged along the cathode gas supply line 43.

Further, the exit of the reform reaction flow channel 21 and entrance of the anode flow channel 32 are connected to each other via an anode gas supply line 42 in which anode gas Ga generated in the reform reaction flow channel 21 flows.

Further, to an exit of the anode flow channel 32, an anode offgas line 45 is connected which sends anode offgas Oa released from this exit to an entrance of the heating flow channel 22. The heating flow channel 22 in the reformer 2 is configured to perform burning reaction by utilizing residual hydrogen (hydrogen not consumed in power generation in the fuel cell 3) contained in anode offgas Oa, substances (especially, combustible substances such as carbon monoxide or methane) other than hydrogen contained in anode gas Ga, and heat energy obtained through the fuel cell 3, etc.

Further, to the cooling medium flow channel 34 in the fuel cell 3, a cooling medium pump 53 for supplying cooling medium gas Gr to this cooling medium flow channel 34 is connected via a cooling gas supply line 44. Further, to an exit of the cooling medium flow channel 34, a cooling medium offgas line 47 for sending cooling medium offgas Or released from this exit to the entrance of the heating flow channel 22 is connected. This heating flow channel 22 is configured to perform burning reaction by utilizing oxygen contained in the cooling medium offgas, and heat energy obtained through the fuel cell 3, etc.

Further, the reform-subject fuel F and the cathode offgas Oc are mixed by a mixing valve 461 of the reform reaction flow channel 21 and sent to the reform reaction flow channel 21, in addition, the anode offgas Oa and the cooling medium offgas Or are mixed by a mixing valve 451 of the heating flow channel 22 and sent to the heating flow channel 22. Further, combustion offgas given after burning reaction in the heating flow channel 22 is released from an exhaust line 48 connected to the exit of the heating flow channel 22, to an outside of the fuel cell system 1.

It is to be noted that the reform-subject fuel F of the present embodiment is hydrocarbon fuel and the cathode gas Gc and the cooling medium gas Gr is air.

Further, the control device 7 conducts a variety of control items in the fuel cell system 1. The control device 7 is configured to receive input data as detected values from the generated power quantity detecting means 63, the supplied fuel quantity detecting means 61, and the supplied cathode gas quantity detection means 62 and send output data for operating these, to the fuel pump 51 and the cathode pump 52.

As shown in FIG. 2, the control device 7 of the present embodiment actuates the fuel cell system 1 to first performs an initial control flow at an initial stage upon start of power generation in the fuel cell 3 and subsequently, at a steady stage of stable power generation in the fuel cell 3, perform a main control flow for monitoring whether the requested generation power quantity Wr requested for the power generation of for the fuel cell 3 has been changed and whether the generated power quantity W has dropped in the fuel cell 3.

Figure 5:
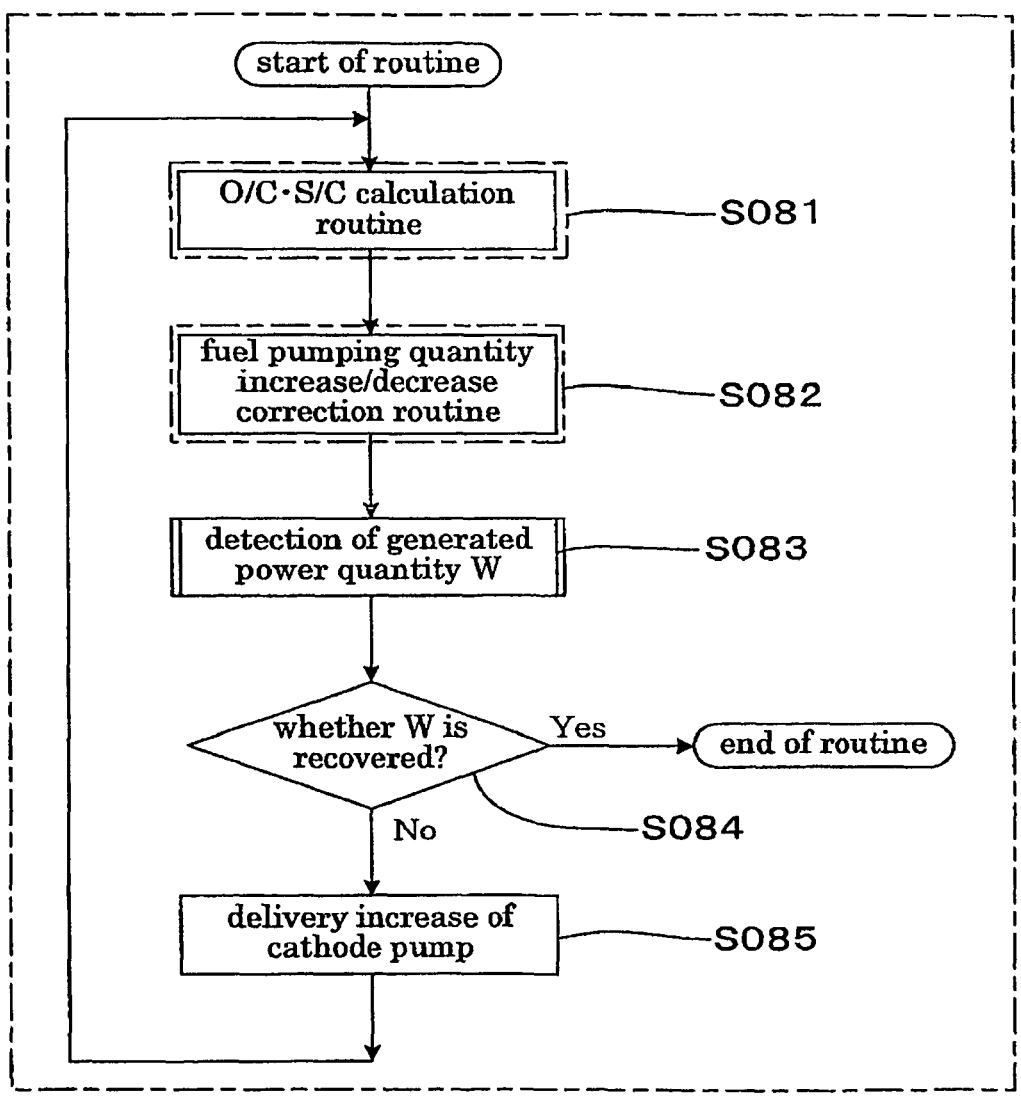
FIG. 5 is a flowchart for showing a generated power quantity recovery routine related to the fuel cell system control method according to the embodiment.
Figure 6:
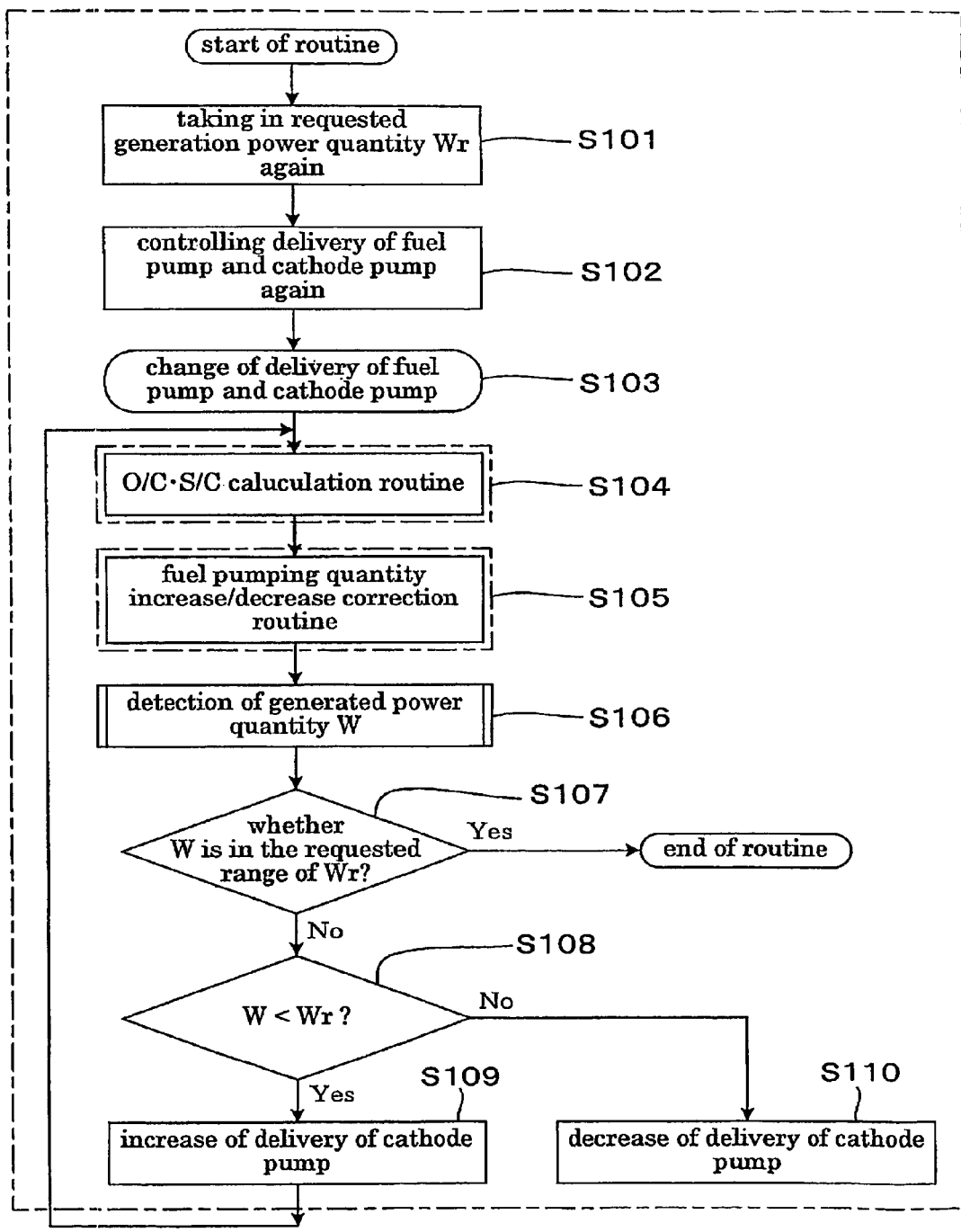
FIG. 6 is a flowchart for showing a generated power quantity alteration routine related to the fuel cell system control method according to the embodiment.

If it is found in the main control flow that the generated power quantity W has dropped in the fuel cell 3, the device performs a generated power quantity recovery routine as shown in FIG. 5 and, if it is found that the requested generation power quantity Wr has been changed, performs a generated power quantity alteration routine as shown in FIG. 6.

Further, in the initial control flow, it executes an O/C S/C calculation routine as shown in FIG. 3 to calculate O/C and S/C and subsequently executes a fuel pumping quantity increase/decrease correction routine as shown in FIG. 4 to change the delivery of the fuel pump 51, thereby correcting the reformed carbon quantity C in accordance with the reformed oxygen quantity O.

Further, in the main control flow, it executes the O/C·S/C calculation routine and the fuel pumping quantity increase/decrease correction routine as shown in FIG. 5 to correct the reformed carbon quantity C in accordance with the reformed oxygen quantity O, thereby recovering the generated power quantity W of the fuel cell 3.

Further, in the generated power quantity alteration routine in the main control flow, it executes the O/C·S/C calculation routine and the fuel pumping quantity increase/decrease correction routine as shown in FIG. 6 to correct the reformed carbon quantity C in accordance with the reformed oxygen quantity O, thereby causing the generated power quantity W of the fuel cell 3 to follow the requested generation power quantity Wr.

The following describes in detail one example of a method of controlling the fuel cell system 1, with reference to FIGS. 2-6.

(Initial Control Flow)

In FIG. 2, upon start of power generation in the fuel cell 3, the control device 7 takes in a requested generation power quantity Wr which the fuel cell 3 is required to generate in order to operate the load 8 (step S01) and determines a target delivery of the fuel pump 51 and that of the cathode pump 52 so that a generated power quantity W of the fuel cell 3 may meet the requested generation power quantity Wr (S02).

It is to be noted that this condition where the generated power quantity W meets the requested generation power quantity Wr refers to such condition that the generated power quantity W is nearly equal to the requested generation power quantity Wr or the generated power quantity W is larger than the requested generation power quantity Wr within a predetermined requested range. This requested range can be set to a value a little higher than a value of the requested generation power quantity Wr.

When determining the delivery of the fuel pump 51 and that of the cathode pump 52, the control device 7 uses a delivery/generated power quantity relational map in which a relationship between the deliveries of these pumps 51 and 52 and the generated power quantity W of the fuel cell 3 is obtained beforehand. This delivery/generated power quantity relational map indicates in a graph etc. how the generated power quantity W changes in the fuel cell 3 when the supplied fuel quantity Qf supplied from the fuel pump 51 to the reform reaction flow channel 21 and the supplied cathode gas quantity Qc supplied from the cathode pump 52 to the cathode flow channel 33 are each changed in condition where in the fuel cell system 1 the temperature in the reform reaction flow channel 21 and that in the fuel cell 3 are each kept in a predetermined temperature range and a pressure in the anode flow channel 32 and that in the cathode flow channel 33 in the fuel cell 3 are each kept in a predetermined pressure range.

When the target delivery of the fuel pump 51 and that of the cathode pump 52 are determined, an absolute quantity value of the reformed carbon quantity C and that of the reformed oxygen quantity O supplied to the reform reaction flow channel 21 are determined.

Further, the delivery/generated power quantity relational map indicates, in a graph, also how O/C and S/C change in the reform reaction flow channel 21 when the delivery of the fuel pump 51 and that of the cathode pump 52 are changed. Therefore, when the delivery of the fuel pump 51 and that of the cathode pump 52 are determined, a target value of O/C and that of S/C in the reform reaction flow channel 21 are also determined.

Then, based on O/C, a rate is determined of oxidative reaction to be performed in the reform reaction flow channel 21, and based on s/c, a rate is determined of water vapor reform reaction to be performed in the reform reaction flow channel 21. Further, in the present embodiment, since burning reaction in the heating flow channel 22 is utilized to heat the reform reaction flow channel 21, it is possible to reduce O/C as much as possible, thereby reducing the quantity of reform-subject fuel F consumed in the oxidative reaction, as much as possible.

Then, the fuel pump 51 and the cathode pump 52 are operated to supply the reform-subject fuel F from the fuel pump 51 to the reform reaction flow channel 21 and also the cathode gas Gc from the cathode pump 52 to the cathode flow channel 33 (S03). In this case, the control device 7 can control the fuel pump 51 so that the supplied fuel quantity Qf detected by the supplied fuel quantity detecting means 61 may be equal to a target delivery of the fuel pump 51 and also control the cathode pump 52 so that the supplied cathode gas quantity Qc detected by the supplied cathode gas quantity detection means 62 may be equal to a target delivery of the cathode pump 52.

The control device 7 then finely adjusts the delivery of the fuel pump 51 and that of the cathode pump 52 until power generation in the fuel cell 3 is stabilized, thus conducting control so that generated power quantity W detected by the generated power quantity detecting means 63 may meet a requested generation power quantity (target generated power quantity) Wr required by the load 8.

In such a manner, in the reform reaction flow channel 21, the reform-subject fuel F supplied from the fuel pump 51 and hot water (water vapor) in the cathode offgas Oc sent from the cathode offgas line 46 perform water vapor reform reaction via the reform catalyst provided in the reform reaction flow channel 21, to generate anode gas Ga containing hydrogen. Further, in the reform reaction flow channel 21, part of the reform-subject fuel F and high temperature oxygen in the cathode offgas Oc perform oxidative reaction to heat inside of the reform reaction flow channel 21. Further, in the heating flow channel 22, hydrogen, combustible substances, etc. in the anode offgas Oa sent from the anode offgas line 45 and high temperature oxygen in the cooling medium offgas Or sent from the cooling medium offgas line 47 perform burning reaction to heat the reform reaction flow channel 21.

Further, the anode flow channel 32 in the fuel cell 3 is supplied with the anode gas Ga from the reform reaction flow channel 21, so that hydrogen in the anode gas Ga passes from the anode flow channel 32 through the hydrogen separation metal layer 311 in the electrolytic body 31 and in protonated condition, passes through the proton conductor layer 312 in the electrolytic body 31 to reach the cathode flow channel 33 in the fuel cell 3. In the cathode flow channel 33, protonated hydrogen and oxygen in the cathode gas Gc supplied from the cathode pump 52 react with each other to generate power in the fuel cell 3.

(O/C·S/C Calculation Routine)

Next, when power generation condition is stabilized in the fuel cell 3, the control device 7 calculates O/C and S/C in the O/C·S/C calculation routine (S04).

That is, as shown in FIG. 3, in the O/C·S/C calculation routine, the control device 7 first uses the supplied fuel quantity detecting means 61 to detect a supplied fuel quantity Qf supplied to the reform reaction flow channel 21 (S041). Then, in the reformed carbon quantity calculation step, it obtains a reformed carbon quantity C supplied to the reform reaction flow channel 21 by using the supplied fuel quantity Qf and the number of moles of carbon contained in the reform-subject fuel F (S042).

Further, the control device 7 uses the generated power quantity detecting means 63 to detect a generated power quantity W in the fuel cell 3 (S043). Then, in the reformed water quantity calculation step, the control device 7 obtains a quantity of generated water generated in the cathode flow channel 33 through power generation in the fuel cell 3, based on the generated power quantity W (S044). In this case, it is possible to use a generated water quantity/generated power quantity relational map in which a relationship between a generated water quantity and a generated power quantity W in the fuel cell 3 is obtained beforehand. Further, in the present embodiment, almost all of the cathode offgas Oc is sent to the reform reaction flow channel 21, so that the reformed water quantity S supplied to the reform reaction flow channel 21 is obtained on the assumption that it is nearly equal to the generated water quantity.

Further, in the reformed oxygen quantity calculation step, the control device 7 obtains a consumed oxygen quantity in the cathode gas Gc consumed in power generation in the fuel cell 3, based on the generated power quantity W (S045). In this case, it is possible to use a consumed oxygen quantity/generated power quantity relational map in which a relationship between a consumed oxygen quantity and a generated power quantity W in the fuel cell 3 is obtained beforehand.

Further, the control device 7 uses the supplied cathode gas quantity detection means 62 to detect a supplied cathode gas Qc supplied to the cathode flow channel 33 (S046). It then obtains a supplied oxygen quantity supplied to the cathode flow channel 33, by using the supplied cathode gas quantity Qc and the number of moles of oxygen contained in the cathode gas Gc (S047).

The control device 7 subtracts the consumed oxygen quantity from the supplied oxygen quantity to obtain a residual oxygen quantity in the cathode offgas Oc in a molar quantity. Further, in the present embodiment, since almost all of the cathode offgas Oc is sent to the reform reaction flow channel 21, the reformed oxygen quantity O supplied to the reform reaction flow channel 21 is obtained on the assumption that it is nearly equal to the residual oxygen quantity (S048).

In such a manner, the reformed carbon quantity C, the reformed oxygen quantity O, and the reformed water quantity S which are supplied to the reform reaction flow channel 21 are obtained in a molar quantity, and the control device 7 obtains O/C and S/C in the reform reaction flow channel 21 (S049).

(Fuel Pumping Quantity Increase/Decrease Correction Routine)

Next, as shown in FIG. 4, in a fuel pumping quantity increase/decrease correction routine (S05), the control device 7 decides whether a value of O/C obtained by the above calculations falls in a target value range in the reformed carbon quantity correction step (S051). If the value of O/C is in the target value range (YES in S051), there is no need to correct a delivery of the fuel pump 51, so that the process immediately ends the fuel pumping quantity increase/decrease correction routine.

On the other hand, if the value of O/C is not in the target value range (NO in S051), the process decides whether the O/C value is larger than the target value (S052). If the value of O/C is larger than the target value (YES in S052), the process decides that a proportion of the reformed carbon quantity C is insufficient and obtains how much the reformed carbon quantity C is insufficient in order to meet the target value of O/C. In accordance with this insufficient quantity of the reformed carbon quantity C, the process obtains a temporary reformed carbon quantity C' required to meet the target O/C value. Further, the process calculates an increase in delivery (delivery increase) of the fuel pump 51 required to supply this temporary reformed carbon quantity C' to the reform reaction flow channel 21 (S053).

On the other hand, if the value of O/C is smaller than the target value (NO in S052), the process decides that the proportion of the reformed carbon quantity C is in excess and obtains excess in reformed carbon quantity C to be decreased based on the reformed oxygen quantity O in order to meet the target O/C value. In accordance with this excess in reformed carbon quantity C, the process calculates a decrease in delivery (delivery decrease) of the fuel pump 51 required to meet the target O/C value (S054).

Further, after the delivery increase from the fuel pump 51 is calculated (after S053), the temporary reformed carbon quantity C' and the reformed water quantity S are used to obtain S/C' (S055). The process decides whether this S/C' is larger than 1 (S056). If the S/C' is larger than 1 (YES in S056), the process determines the temporary reformed carbon quantity C' as the reformed carbon quantity C to be supplied to the reform reaction flow channel 21 and also determines an delivery increase of the fuel pump 51.

On the other hand, if the S/C' is 1 or less (NO in S056), to set the S/C' to a value larger than 1, the process recalculates the temporary reformed carbon quantity C' (S057). The process determines such a value of the temporary reformed carbon quantity C' that S/C' may be an appropriate value larger than 1, as a reformed carbon quantity C supplied to the reform reaction flow channel 21, to correctively decrease an delivery increase of the fuel pump 51 in order to accommodate this reformed carbon quantity C (S058).

In such a manner, by recalculating the temporary reformed carbon quantity C' so that S/C' may not be 1 or less, it can be prevented that an excessive quantity of carbon is supplied to the reform reaction flow channel 21 to leave unreacted carbon in the reform reaction flow channel 21 leading to deterioration of the reform catalyst etc. provided in the reform reaction flow channel 21.

Subsequently, after the delivery increase from the fuel pump 51 is corrected to decrease (after S058), it is considered that a proportion of the reformed oxygen quantity O goes excess against the reformed carbon quantity C supplied to the reform reaction flow channel 21 and, the O/C value exceeds a target value, so that the reform reaction flow channel 21 may be heated more than necessary. Therefore, to keep the temperature in the reform reaction flow channel 21 to an appropriate value, the process calculates a decrease in heating required to suppress burning reaction in the heating flow channel 22 (S059). In accordance with this decrease in heating of the heating flow channel 22, burning for heating in the heating flow channel 22 is suppressed (S060). To suppress the burning heating in the heating flow channel 22, part of anode gas Ga flowing through the anode offgas line 45 can also be released.

In accordance with the delivery increase or decrease from the fuel pump 51 thus calculated, the delivery of the fuel pump 51 is changed (S061).

By thus executing the fuel pumping quantity increase/decrease correction routine, it is possible to adjust the delivery of the fuel pump 51 so that O/C may be kept in a target value range against a reformed oxygen quantity O obtained taking into account the generated power quantity W in the fuel cell 3. With this, power is generated appropriately in the fuel cell 3.

(Main Control Flow)

As shown in FIG. 2, in the fuel cell system 1, after control is started in condition where O/C and S/C are each in a target value range, the generated power quantity detecting means 63 is used to detect a generated power quantity W in the fuel cell 3 (S06). The process monitors whether this generated power quantity W in the fuel cell 3 meets a requested generation power quantity Wr. That is, the control device 7 sequentially monitors whether the generated power quantity W meets the requested generation power quantity Wr (S07) and whether the requested generation power quantity Wr is changed (S09).

If the generated power quantity W has dropped below the requested generation power quantity Wr (YES in S07), the process executes the generated power quantity recovery routine (S08).

(Generated Power Quantity Recovery Routine)

If the generated power quantity W is less than the requested generation power quantity Wr, some abnormality is suspected to have occurred in the fuel cell system 1. In this case, due to a decrease in the generated power quantity W, consumed oxygen quantity decreases in the cathode gas Gc which is consumed through power generation in the fuel cell 3, so that by this quantity of decrease, a residual oxygen quantity in the cathode offgas Oc increases, thus increasing a reformed oxygen quantity O to be supplied to the reform reaction flow channel 21.

Therefore, by executing the following generated power quantity recovery routine, the delivery of the fuel pump 51 is increased in accordance with an increase in the reformed oxygen quantity O, and by increasing the reformed carbon quantity C, the above-described O/C is kept in the target value range, to recover the generated power quantity W to meet the requested generation power quantity Wr.

That is, as shown in FIG. 5, in the generated power quantity recovery routine (S08) as a generated power quantity recovery step, as described above, the process executes the O/C·S/C calculation routine (S081) to calculate O/C and S/C again and also executes the above-described fuel pumping quantity increase/decrease correction routine (S082), to appropriately change the delivery of the fuel pump 51. Specifically, to keep the O/C value in the target value range, the reformed carbon quantity C is increased in accordance with an increase in the reformed oxygen quantity O, thus increasing the delivery of the fuel pump 51.

After that, the generated power quantity detecting means 63 is used to detect a generated power quantity W in the fuel cell 3 again (S083). Then, the process decides whether the generated power quantity W is recovered, that is, the generated power quantity W meets a requested generation power quantity Wr (S084). If the generated power quantity W is recovered (YES in S084), the process ends the generated power quantity recovery routine.

If the generated power quantity W is not recovered even if the O/C·S/C calculation routine and the fuel pumping quantity increase/decrease correction routine are executed (NO in S084), on the other hand, it is considered that the generated power quantity W cannot be recovered any more only by increasing the delivery of the fuel pump 51, so that the process increases the delivery of the cathode pump 52 (S085). By thus increasing the delivery of this cathode pump 52, the residual oxygen quantity in the cathode offgas Oc increases, to increase the reformed oxygen quantity O. Therefore, it is considered that by executing the O/C·S/C calculation routine and the fuel pumping quantity increase/decrease correction routine again, the generated power quantity W is recovered.

Further, the delivery of the cathode pump 52 is increased little by little stepwise to repeat processing of S081 through S085 until the generated power quantity W is recovered (until YES is given as a result of decision in S084), whereupon the generated power quantity recovery routine is ended.

It is thus possible to recover the generated power quantity W in the fuel cell 3 to meet the requested generation power quantity Wr in condition where O/C and S/C are each kept in a target value range as much as possible, even if some abnormality has occurred on the fuel cell system 1.

It is to be noted that when the fuel cell system 1 is recovered from the abnormal condition to normal condition to increase the generated power quantity W, the delivery of the fuel pump 51 can be restored to original condition (condition before increase/decrease correction).

Next, if the requested generation power quantity Wr required to generated in the fuel cell 3 is changed in the main control flow in FIG. 2 (YES in S09), the process executes a generated power quantity alteration routine (S10).

(Generated Power Quantity Alteration Routine)

If the requested generation power quantity Wr required for power generation in the fuel cell 3 is changed, it is necessary to cause the generated power quantity W in the fuel cell 3 to follow the post-alteration requested generation power quantity Wr. Therefore, in the generated power quantity alteration routine, by appropriately changing the delivery of the fuel pump 51 and that of the cathode pump 52, the generated power quantity W is caused to follow the post-alteration requested generation power quantity Wr.

That is, as shown in FIG. 6, in the generated power quantity alteration routine (S10) as a generated power quantity following step, the control device 7 first takes in a changed requested generation power quantity Wr again (S101) and uses the delivery/generated power quantity relational map, to re-determine a target delivery of the fuel pump 51 and that of the cathode pump 52 so that the generated power quantity W may meet the requested generation power quantity Wr (S102).

Specifically, if the requested generation power quantity Wr is changed to increase, the control device 7 re-determines to increase the delivery of the fuel pump 51 and that of the cathode pump 52 and, if the requested generation power quantity is changed to decrease, on the other hand, re-determines to decrease the delivery of the fuel pump 51 and that of the cathode pump 52.

Then, the control device 7 changes the delivery of the fuel pump 51 and that of the cathode pump 52 (S103). It is thus possible to cause the generated power quantity W in the fuel cell 3 to follow the requested generation power quantity Wr.

Subsequently, as an O/C correction step, the process executes the above-described O/C·S/C calculation routine (S104) to calculate O/C and S/C again and also executes the above-described fuel pumping quantity increase/decrease correction routine (S105) to change the delivery of the fuel pump 51 appropriately.

Specifically, if O/C is above a target value range, the delivery of the fuel pump 51 is increased and the reformed carbon quantity C is increased correctively. If O/C is less than the target value range, on the other hand, the delivery of the fuel pump 51 is decreased and the reformed carbon quantity C is decreased correctively. It is thus possible to return O/C into the target value range again even if a value of the O/C has gone out of the target value range when the generated power quantity W is changed to follow the requested generation power quantity Wr.

After that, the generated power quantity detecting means 63 is used to detect the generated power quantity W in the fuel cell 3 again (S106). Then, the process decides whether the generated power quantity W is in the requested range of the requested generation power quantity Wr (S107). If the generated power quantity W is in the requested range of the requested generation power quantity Wr (YES in S107), the process ends the generated power quantity alteration routine. It is to be noted that the requested range of the requested generation power quantity Wr can be set to a range from a value nearly equal to the requested generation power quantity Wr to a value a little larger than the requested generation power quantity Wr.

On the other hand, if the generated power quantity W is out of the requested range of the requested generation power quantity Wr (NO in S107), it is considered that the generated power quantity W cannot be recovered any more by increasing the delivery of the fuel pump 51, so that the delivery of the cathode pump 52 is increased or decreased.

That is, first the process decides whether the generated power quantity W is less than the requested generation power quantity Wr (S108). If the generated power quantity W is less than the requested generation power quantity Wr (YES in S108), the process increases the delivery of the cathode pump 52 (S109). With this, the residual oxygen quantity in the cathode offgas Oc increases to increase the reformed oxygen quantity O, so that it is considered that when the O/C·S/C calculation routine (S104) and the fuel pumping quantity increase/decrease correction routine (S105) are executed again, the reformed carbon quantity C is increased to increase the generated power quantity W.

On the other hand, if the generated power quantity W is above the requested range of the requested generation power quantity Wr (NO in S108), the process decreases the delivery of the cathode pump 52 (S110). With this, the residual oxygen quantity in the cathode offgas Oc decreases to decrease the reformed oxygen quantity O, so that it is considered that when the O/C·S/C calculation routine (S104) and the fuel pumping quantity increase/decrease correction routine (S105) are executed again, the reformed carbon quantity C is decreased to decrease the generated power quantity W.

In this case, the delivery of the cathode pump 52 is increased or decreased little by little stepwise to repeat processing of S104 through S110 until the generated power quantity W falls in the requested range of the requested generation power quantity Wr (until YES is given as a result of S107), whereupon the generated power quantity alteration routine is ended.

In such a manner, even if the requested generation power quantity Wr is changed to increase or decrease, the control device 7 can change the generated power quantity W in the fuel cell 3 so that it may follow a change in the requested generation power quantity Wr in the condition that O/C and S/C are kept in a target range as possible.

Further, in FIG. 2, the control device 7 can receive a power generation end signal, to end power generation in the fuel cell 3 appropriately.

In the present embodiment, the degree of heating in the heating flow channel 22 has been changed only when the S/C' is 1 or less. However, the degree of heating in the heating flow channel 22 can be changed also in accordance with a change in the reformed carbon quantity C when the delivery of the fuel pump 51 and that of the reformed carbon quantity C are changed.

That is, to increase the delivery of the fuel pump 51, the degree of heating in the heating flow channel 22 can be increased so that the temperature in the reform reaction flow channel 21 may be kept to an appropriate level. To decrease the delivery of the fuel pump 51, on the other hand, the degree of heating in the heating flow channel 22 can be decreased so that the temperature in the reform reaction flow channel 21 may be kept to an appropriate level.

Figure 7:
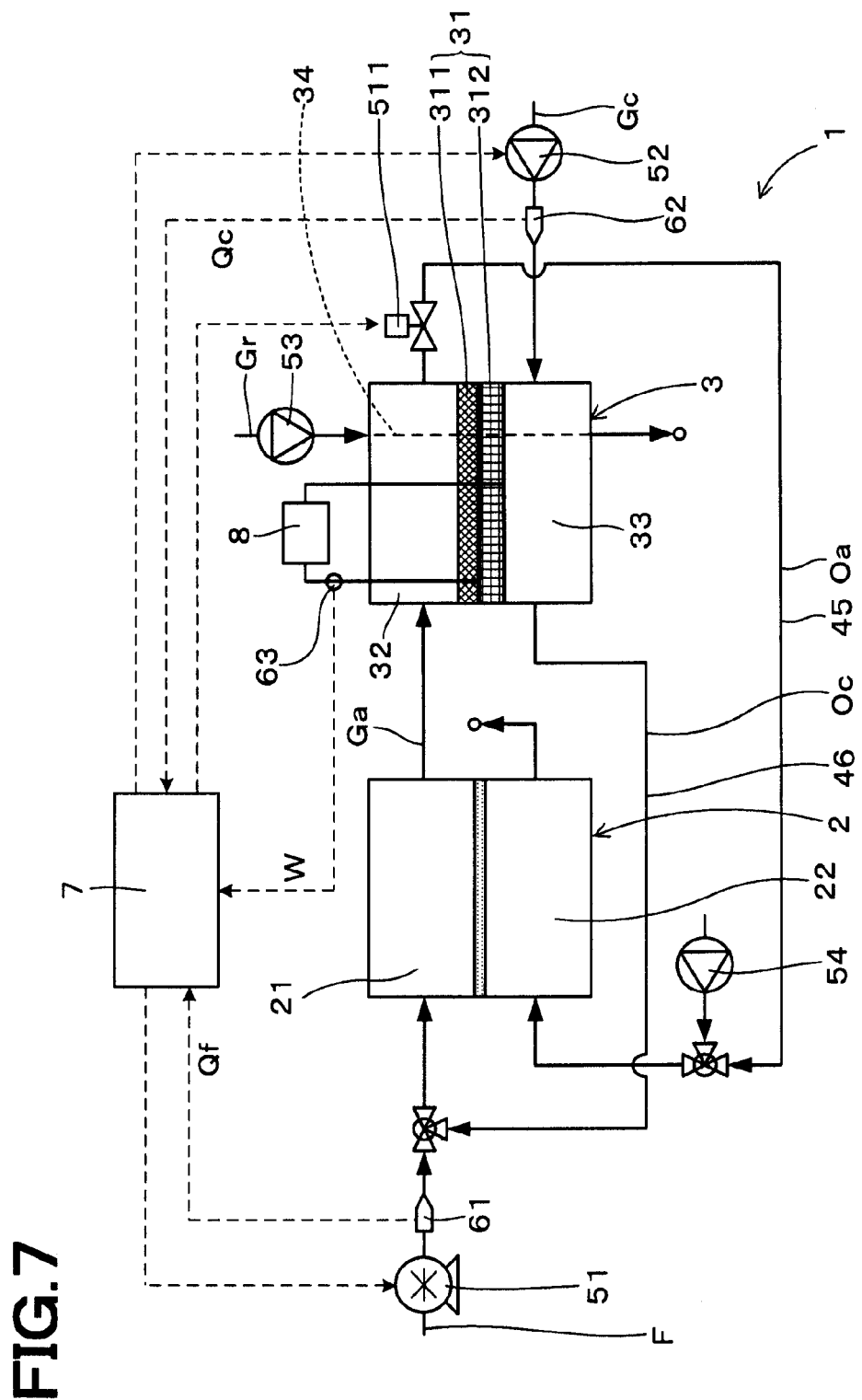
FIG. 7 is an explanatory diagram for showing a configuration of another fuel cell system according to the embodiment.

Further, as shown in FIG. 7, in the anode offgas line 45, the exit of the anode flow channel 32 in the fuel cell 3 can be provided with an anode regulator 511 for raising a pressure in the anode flow channel 32. If the generated power quantity W has dropped in the fuel cell 3, an opening of the anode regulator 511 can be decreased. With this, the pressure in the anode flow channel 32 rises to increase a power generation efficiency in the fuel cell 3, thereby enabling recovering the generated power quantity W even more rapidly. Once the generated power quantity W is thus recovered, the opening of the anode regulator 511 can be returned to initial condition.

Further, as shown in FIG. 7, if the cooling medium pump 53 is rendered of a liquid cooling type for cooling the fuel cell 3 by using liquid, the entrance of the heating flow channel 22 can be provided with a heating flow channel pump 54 for supplying air etc. to the heating flow channel 22.

As described above, in the present embodiment, a generated power quantity W in the fuel cell 3 has been detected to correct the reformed carbon quantity C by using a reformed oxygen quantity O obtained on the basis of this generated power quantity W so that a value of O/C in the reform reaction flow channel 21 may be equal to a target value. It is thus possible to correct the reformed carbon quantity C appropriately, thereby keeping O/C in the reform reaction flow channel 21 to an appropriate value. Further, in this correction of the reformed carbon quantity C, care is taken so that S/C may not be 1 or less, thus enabling keeping S/C also in the reform reaction flow channel 21 to an appropriate value.

Further, in the present embodiment, almost all of the cathode offgas Oc released from the cathode flow channel 33 has been supplied via the cathode offgas line 46 to the reform reaction flow channel 21. O/C and S/C can each be kept to an appropriate value without providing this cathode offgas line 46 with a control valve etc. for controlling the reformed oxygen quantity O and the reformed water quantity S to be supplied to the reform reaction flow channel 21.

Therefore, by the fuel cell system 1 and the method for controlling the same according to the present embodiment, it is possible to keep each of O/C and S/C in the reform reaction flow channel 21 to an appropriate value by using a reformed oxygen quantity O which is calculated by assuming actual power generation condition in the fuel cell 3, without complicating the fuel cell system 1.

The invention claimed is:

1. A method for controlling a fuel cell system, the system comprising:

a reformer provided with a reform reaction flow channel for generating anode gas containing hydrogen from reform-subject fuel;

a fuel cell provided with an anode flow channel to which the hydrogen contained in the anode gas is supplied by supplying the anode gas from the reform reaction flow channel, a cathode flow channel to which a cathode gas containing oxygen is supplied, and an electrolytic body arranged between the cathode flow channel and the anode flow channel;

a fuel pump for supplying the reform-subject fuel to the reform reaction flow channel;

supplied fuel quantity detecting means for detecting a supplied fuel quantity, which indicates a quantity of the reform-subject fuel supplied by the fuel pump;

a cathode pump for supplying the cathode gas to the cathode flow channel;

supplied cathode gas quantity detecting means for detecting a supplied cathode gas quantity, which indicates a quantity of the cathode gas supplied by the cathode pump;

generated power quantity detecting means for detecting a generated power quantity in the fuel cell; and a control device for controlling a delivery of the reform-subject fuel by the fuel pump and a delivery of the cathode gas by the cathode pump so that the generated power quantity may be equal to a requested generation power quantity which is necessary to operate a load utilizing power generated by the fuel cell, wherein:

a cathode offgas line for sending the cathode offgas released from the cathode flow channel to the reform reaction flow channel is connected to the cathode flow channel; and the method comprising:
a reformed carbon quantity calculation step for obtaining a reformed carbon quantity C, which indicates a quantity of carbon supplied to the reform reaction flow channel, based on the supplied fuel quantity detected by the supplied fuel quantity detecting means;
a reformed oxygen quantity calculation step for obtaining a consumed oxygen quantity, which indicates a quantity of oxygen contained in the cathode gas consumed to generate power in the fuel cell, from the generated power quantity detected by the generated power quantity detecting means and also obtaining a supplied oxygen quantity, which indicates a quantity of oxygen supplied to the cathode flow channel, from the supplied cathode gas quantity detected by the supplied cathode gas quantity detecting means and then obtaining the residual oxygen quantity in the cathode offgas by subtracting the consumed oxygen quantity from the supplied oxygen quantity and obtaining a reformed oxygen quantity O, which indicates a quantity of oxygen supplied to the reform reaction flow channel, based on the residual oxygen quantity; and
a reformed carbon quantity correction step for correcting the reformed carbon quantity C by changing only the delivery of the fuel pump so that O/C, which is a proportion of the reformed oxygen quantity O against the reformed carbon quantity C, may be kept in a target range.

2. The method for controlling a fuel cell system according to claim 1, the method further comprising:
a reformed water quantity calculation step for obtaining a quantity of generated water, which is a quantity of water present in the cathode flow channel following generation in the fuel cell, based on the generated power quantity, and obtaining a reformed water quantity S, which is a quantity of water supplied to the reform reaction flow channel, based on the quantity of generated water; and
when correcting the reformed carbon quantity C with changing a delivery of the fuel pump in the reformed carbon quantity correction step, keeping also S/C, which is a proportion of the reformed water quantity S against the reformed carbon quantity C, in a target range.

3. The method for controlling a fuel cell system according to claim 2, the method further comprising:
a generated power quantity recovery step for:
performing the reformed carbon quantity calculation step, the reformed oxygen quantity calculation step, the reformed water quantity calculation step and the reformed carbon quantity correction step, if the fuel cell system encounters an abnormality to lower the generated power quantity below the requested generation quantity, and
increasing a delivery of the fuel pump and increasing the reformed carbon quantity C depends on an increase of the reformed oxygen quantity O due to a decrease in the generated power quantity, so that the above-described O/C may fall in the target range and the generated power quantity is recovered to meet the requested generation quantity.

4. The method for controlling a fuel cell system according to claim 3, the method further comprising a step in the generated power quantity recovery step for limiting an increase of a delivery in the fuel pump so that the above-described S/C may not be 1 or less, when increasing the delivery of the fuel pump.

5. The method for controlling a fuel cell system according to claim 4, wherein the reformer is provided with a heating flow channel which is formed adjacent to the reform reaction flow channel, to perform burning reaction so that this reform reaction flow channel may be heated; and
the method further comprising a step in the generated power quantity recovery step for suppressing burning reaction in the heating flow channel if a delivery of the fuel pump cannot be increased because the above-described S/C may be 1 or less.

6. The method for controlling a fuel cell system according to claim 2, the method further comprising:
a generated power quantity following step for, if the requested generation power quantity is changed to increase, re-determining to increase a delivery of the fuel pump and that of the cathode pump, on the other hand, if the requested generation power quantity is changed to decrease, re-determining to decrease a delivery of the fuel pump and that of the cathode pump, thereby causing the generated power quantity to follow the requested generation quantity; and
an O/C correction step for, after performing the reformed carbon quantity calculation step, the reformed oxygen quantity calculation step, and the reformed water quantity calculation step again after this generated power quantity following step is performed, if the above-described O/C is above the target range, increasing the delivery of the fuel pump and correcting the reformed carbon quantity C to increase so that this O/C may be returned into the target range, on the other hand, if the above-described O/C is below the target range, decreasing the delivery of the fuel pump and correcting the reformed oxygen quantity C to decrease so that this O/C may be returned into the target range.

7. The method for controlling a fuel cell system according to claim 6, the method further comprising a step in the O/C correction step for limiting an increase of a delivery of the fuel pump so that the above-described S/C may not be 1 or less, when increasing the delivery of the fuel pump.

8. The method for controlling a fuel cell system according to claim 7, wherein the reformer is provided with the heating flow channel which is formed adjacent to the reform reaction flow channel, to perform burning reaction so that this reform reaction flow channel may be heated; and
the method further comprising a step in the O/C correction step for suppressing burning reaction in the heating flow channel if a delivery of the fuel pump cannot be increased because the above-described S/C may be 1 or less.

9. A fuel cell system comprising:
a reformer provided with a reform reaction flow channel for generating anode gas containing hydrogen from reform-subject fuel;
a fuel cell provided with an anode flow channel to which the hydrogen contained in the anode gas is supplied by supplying the anode gas from the reform reaction flow channel, a cathode flow channel to which a cathode gas containing oxygen is supplied, and an electrolytic body arranged between the cathode flow channel and the anode flow channel;
a fuel pump for supplying the reform-subject fuel to the reform reaction flow channel;
supplied fuel quantity detecting means for detecting a supplied fuel quantity, which indicates a quantity of the reform-subject fuel supplied by the fuel pump;
a cathode pump for supplying the cathode gas to the cathode flow channel;

supplied cathode gas quantity detecting means for detecting a supplied cathode gas quantity, which indicates a quantity of the cathode gas supplied by the cathode pump;

generated power quantity detecting means for detecting a generated power quantity in the fuel cell; and a control device for controlling a delivery of the reform-subject fuel by the fuel pump and a delivery of the cathode gas by the cathode pump so that the generated power quantity may be equal to a requested generation power quantity which is necessary to operate a load utilizing power generated by the fuel cell, wherein:

a cathode offgas line for sending the cathode offgas released from the cathode flow channel to the reform reaction flow channel is connected to the cathode flow channel; and the control device is configured to perform:

a reformed carbon quantity calculation step for obtaining a reformed carbon quantity C, which indicates a quantity of carbon supplied to the reform reaction flow channel, based on the supplied fuel quantity detected by the supplied fuel quantity detecting means;

a reformed oxygen quantity calculation step for obtaining a consumed oxygen quantity, which indicates a quantity of oxygen contained in the cathode gas consumed to generate power in the fuel cell, from the generated power quantity detected by the generated power quantity detecting means and also obtaining a supplied oxygen quantity, which indicates a quantity of oxygen supplied to the cathode flow channel, from the supplied cathode gas quantity detected by the supplied cathode gas quantity detecting means and then obtaining the residual oxygen quantity in the cathode offgas by subtracting the consumed oxygen quantity from the supplied oxygen quantity and obtaining a reformed oxygen quantity O, which indicates a quantity of oxygen supplied to the reform reaction flow channel, based on the residual oxygen quantity; and a reformed carbon quantity correction step for correcting the reformed carbon quantity C by changing only the delivery of the fuel pump so that O/C, which is a proportion of the reformed oxygen quantity O against the reformed carbon quantity C, may be kept in a target range.

10. The fuel cell system according to claim 9, wherein the control device is configured to:

perform also a reformed water quantity calculation step for obtaining a quantity of generated water, which is a quantity of water present in the cathode flow channel following generation in the fuel cell, based on the generated power quantity, and obtaining a reformed water quantity S, which is a quantity of water supplied to the reform reaction flow channel, based on the quantity of generated water; and when correcting the reformed carbon quantity C with changing a delivery of the fuel pump in the reformed carbon quantity correction step, keep also S/C, which is a proportion of the reformed water quantity S against the reformed carbon quantity C, in a target range.

* * * * *